United States Patent [19]
Morikawa

[11] Patent Number: 5,414,793
[45] Date of Patent: May 9, 1995

[54] SPEED CONTROL MECHANISM FOR A POWER TOOL

[75] Inventor: Hiroshi Morikawa, Clemson, S.C.

[73] Assignee: Ryobi Motor Products Corp., Easley, S.C.

[21] Appl. No.: 54,774

[22] Filed: Apr. 27, 1993

[51] Int. Cl.⁶ .............................................. H01H 9/06
[52] U.S. Cl. ................... 388/824; 388/840; 388/937; 200/522; 200/332.2
[58] Field of Search ................... 388/824, 840, 937; 200/522, 505, 332, 332.2, 335, 47, 327; 81/469; 173/170, 176, 179

[56] References Cited

U.S. PATENT DOCUMENTS

| | | | |
|---|---|---|---|
| 2,525,839 | 10/1950 | Sparklin | 172/36 |
| 3,221,192 | 11/1965 | Franklin | 310/68 |
| 3,309,484 | 3/1967 | Frenzel | 200/157 |
| 3,383,943 | 5/1968 | Piber | 74/529 |
| 4,241,297 | 12/1980 | Piber et al. | 318/17 |
| 4,276,461 | 6/1981 | Piber | 200/329 |
| 4,506,198 | 3/1985 | Savas | 388/824 |
| 4,572,997 | 2/1986 | Yamanobe et al. | 318/17 X |
| 4,649,245 | 3/1987 | Lessig, III et al. | 200/157 |
| 4,998,589 | 3/1991 | Wiesendanger | 200/327 X |
| 5,063,806 | 11/1991 | Mayfield | 83/471.3 |

Primary Examiner—William M. Shoop, Jr.
Assistant Examiner—Brian Sircus
Attorney, Agent, or Firm—Brooks & Kushman

[57] ABSTRACT

A speed control mechanism allowing a user to control the operating speed of a power tool. The speed control mechanism includes a drive motor and a handle connected to the power tool including a trigger, a speed governor and a cam assembly. The trigger is displaced from a first position by the user to initiate operation of the drive motor. The trigger cooperates with the speed governor to vary the operating speed of the drive motor based on the displacement of the trigger. The cam control assembly is operated by the user and cooperates with the trigger to control the extent to which the trigger can be displaced from the first position by the user, thereby limiting the operating speed of the motor. In one embodiment, the speed control mechanism is for use with the drive motor of the power tool to control the operating speed of the power tool. In an alternative embodiment, the speed control mechanism is used with a radial arm saw including an anti-kick forward device. In this embodiment, the speed control mechanism controls the operating speed of the motor of the anti-kick forward device, allowing the user to limit the rate at which the saw blade can be moved.

14 Claims, 1 Drawing Sheet

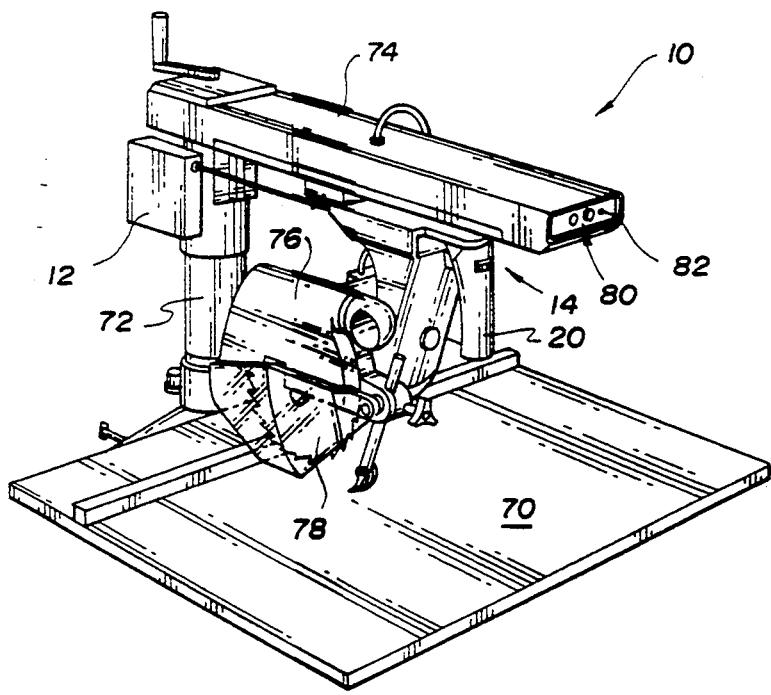
fig-1
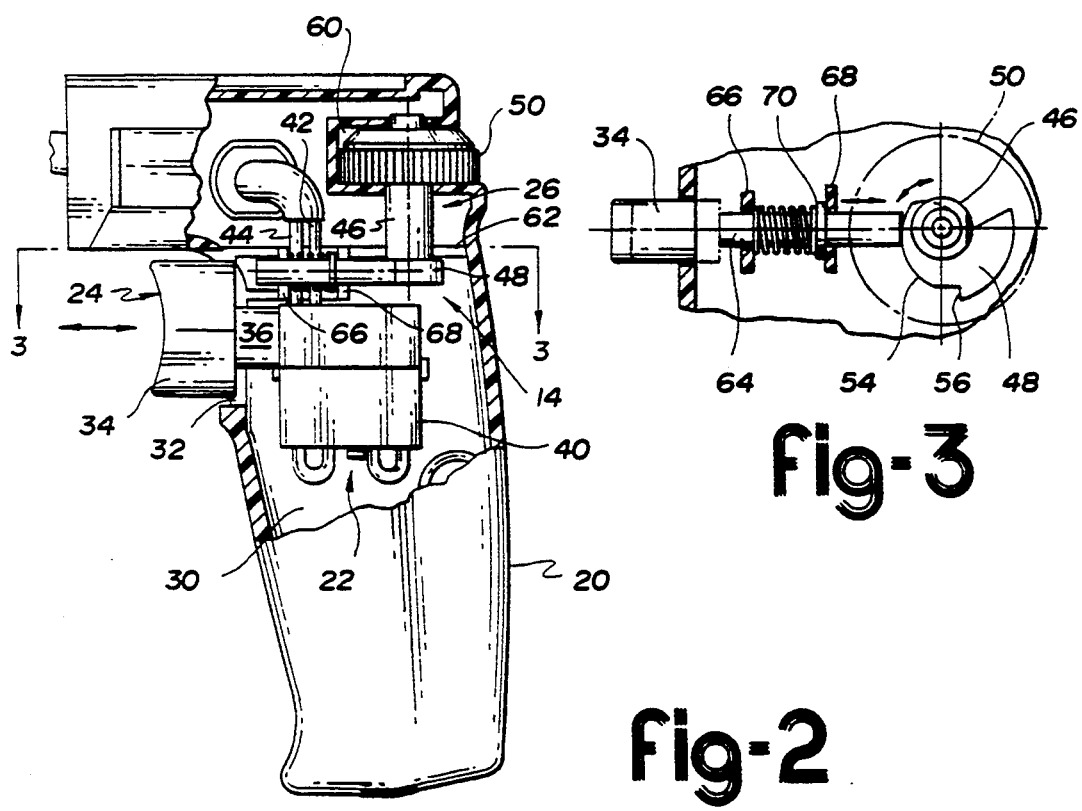
fig-3
fig-2

SPEED CONTROL MECHANISM FOR A POWER TOOL

TECHNICAL FIELD

The present invention relates to power tools and, more particularly, to a speed control mechanism for use with power tools.

BACKGROUND ART

Speed control mechanisms for electrical power tools often employ a switch mounted in the handle of the power tool that may be operated by the user to vary the speed of the power tool drive motor. Such switches generally comprise a trigger, or button member, which may be operated by the index finger of the hand of the user holding the power tool. Initial depression of that trigger operates to close switch contacts to connect the device to an electrical source. Further and subsequent depression of the trigger operates a variable resistor to change the amount of resistance present in a speed control circuit, thereby regulating the speed of the power tool drive motor. Such triggers are commonly employed in conjunction with radial arm saws, jigsaws, power drills, power screwdrivers, etc.

Different speeds of operation are often desirable depending upon the application to which the power tool is being used. It may be desirable to operate the power tool a number of times consecutively at a predetermined speed, or it may be desirable to operate the tool at a predetermined constant speed for an extended period of time.

For example, in the case of a radial arm saw or a power drill, a particular speed may be desirable depending upon the material being cut to obtain cleaner cuts in the case of a radial arm saw, or to obtain cleaner bores in the case of a power drill. Also, a particular speed may be desired in order to efficiently and effectively use variously configured or sized appliances, such as different blades or bits. A particular speed may likewise be desired in order to use a power tool for various applications, such as for using a power drill, power screwdriver, sander, nut driver, etc.

The use of a trigger, by itself, is not generally desirable to achieve an optimum operating speed. If the tool is to be used a number of times consecutively, a user is typically unable to depress the trigger to the same position each time to achieve the same desired optimum operating speed. In the case of the power tool being operated at a constant speed for extended periods of time, it is difficult, if not impossible, for a user to hold and maintain a trigger in the same depressed position during such operation and the speed of operation during usage will vary. In the case of a radial arm saw or power drill, the result is that the cut or bore is not as smooth or precise as it could be.

Attempts have been made in the past to provide a speed control mechanism which would enable the user to operate a power tool at a desired optimum speed. However, none of those devices suggest the mechanism disclosed and claimed in this specification. Several of those patents are briefly reviewed here to show the state of the art.

For example, U.S. Pat. No. 2,525,839 issued on Oct. 17, 1950 to Sparklin discloses a "Variable-Speed Electric Drill" and U.S. Pat. No. 3,383,943 issued on May 21, 1968 to Piber discloses a "All-Speed Lever Lock." Both of these patents teach the use of a locking mechanism to lock the trigger in any depressed position. Those mechanisms, however, leave certain problems unsolved. First, if the tool is to be used a number of times consecutively, there is no way to return to the same trigger position each time. Second, these mechanisms do not allow an operator to easily change the speed during operation of the power tool. Still further, the locking device must be released before the trigger position is changed and then must be reset again afterwards.

U.S. Pat. No. 3,221,192 issued on Nov. 30, 1965 to Franklin discloses a "Variable Speed Hand Tool." The mechanism disclosed includes a power tool casing having both an on-off trigger switch and a separate control knob for controlling the speed of the power tool. While this mechanism allows the speed of the power tool to be adjusted during operation, it eliminates the normal function of the trigger, i.e. to vary the operating speed of the power tool. During some operations, a user may want to immediately decelerate the tool depending on varying cutting conditions. That is not possible with the Franklin mechanism without turning the separate control knob in which case the knob would then have to be reset in order to re-achieve the optimum operating speed.

U.S. Pat. No. 3,309,484 issued on Mar. 14, 1967 to Frenzel discloses a "Trigger Actuated Switch Device." This patent teaches the use of an adjustment member mounted rotatably within a trigger and threadably engaging a lug means which abuts the casing of the power tool, thereby limiting the depression of the trigger. The adjustment member has a knob located on the trigger itself which can be turned to move the lug and thereby adjust the extent to which the trigger can be depressed and the maximum speed at which the power tool may be operated. The disadvantage of this mechanism is that adjustments in the operating speed of the power tool cannot be easily and quickly made during operation. First, the index finger operating the trigger partially covers and interferes with rotation of the adjustment member. Thus, the trigger would have to be released and the adjustment member reset each time a change in optimum speed is desired.

Accordingly, there remains a need for a simple mechanism by which the maximum optimum operating speed of a power tool may be adjusted quickly, even during operation of the power tool.

SUMMARY OF THE INVENTION

An object of the present invention is to provide a relatively simple speed control mechanism for power tools which would allow the tool operator to easily and quickly adjust the speed at which the power tool may be operated, even during operation of the power tool.

In carrying out the above object, and other objects and features of the present invention, there is a speed control mechanism allowing a user to control the operating speed of a power tool, the speed control mechanism comprising a drive motor, and a handle connected to the power tool including a trigger, a speed governor and a cam assembly. The trigger is displaced from a first position by the user to initiate operation of the drive motor. The trigger cooperates with the speed governor to vary the operating speed of the drive motor based on the displacement of the trigger. The cam control assembly is operated by the user, and cooperates with the trigger to control the extent to which the trigger can be displaced from the first position by the user, thereby limiting the operating speed of the power tool.

The advantages accruing to the present invention are numerous. For example, the cam control assembly is easily accessible and adjustable by the operator, allowing the speed of the power tool to be easily adjusted during operation of the power tool. A further advantage is that the optimum speed of the power tool may be adjusted simply and quickly without the use of adjustment tools. Yet another advantage is that through the use of indicia on the cam control assembly, the power tool may easily be adjusted, time after time, to the same optimum speed for any required use. Furthermore, the mechanics of the present invention are fairly simple, and may be easily and economically manufactured and assembled.

As for the mechanism of the present invention, in one preferred embodiment the handle is used in conjunction with a radial arm saw and is attached to a saw carriage which carries the saw drive motor. The radial arm saw frame includes a column adapted to receive a mounting arm assembly in such a manner as to permit pivotal movement of the arm assembly about the column axis. The saw carriage is mounted on the arm assembly and is movable on the arm assembly in a radial direction relative to the axis of the column. An anti-kick forward device is preferably connected to the column and is operably connected to the saw carriage and the speed control mechanism of the present invention for limiting the maximum speed at which the carriage may be moved along the arm assembly.

An advantage of using the present invention in conjunction with the radial arm saw described is that the speed at which the saw carriage may be moved may be controlled, lessening the possibility of the saw kicking when the rotating blade encounters resistance in the material being cut. Such control increases the smoothness and accuracy of the cut.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF THE DRAWINGS

FIG. 1 is a perspective view of a radial arm saw including an anti-kick forward device and the speed control mechanism of the present invention;

FIG. 2 is a partially broken away side view of the handle of the saw shown in FIG. 1, illustrating one embodiment of the speed control mechanism of the present invention; and FIG. 3 is a partially broken away sectional view of the speed control mechanism of the present invention, taken along line 3—3 of FIG. 2.

BEST MODE FOR CARRYING OUT THE INVENTION

Referring now to FIG. 1, there is illustrated a radial arm saw, shown generally by reference numeral 10, having an anti-kick forward device 12 and a speed control mechanism shown generally by reference numeral 14. Although a radial arm with an anti-kick forward device is the illustrated application of the present invention, it should be appreciated that the invention is generally applicable to a number of power tools such as drills, screwdrivers, and the like.

With combined reference to FIGS. 1 and 2, the speed control mechanism 14 includes a handle 20 having a speed governor 22, a trigger switch 24, and a cam assembly 26. The saw 10 also includes an appropriate drive motor for driving the saw blade. The handle 20 defines a cavity 30 and a first opening 32 through which the trigger switch 24 extends. The handle 20 may be made from any appropriate material, such as metal or plastic.

With continuing reference to FIG. 2, the trigger switch 24, as illustrated in this embodiment, may be of a unitary construction and includes a finger-engageable trigger portion 34 and a stem portion 36. The speed governor 22 defines a guideway which slidably receives the stem portion 36 of the trigger switch 24 such that the switch is generally axially displaced in the directions indicated by the arrows. As shown, the speed governor 22 includes a variable resistor 40.

A radial arm saw with an anti-kick forward device such as that shown in FIG. 1 is described in U.S. Pat. No. 5,063,806, issued on Nov. 12, 1991 to Mayfield, which is hereby expressly incorporated by reference in its entirety. As disclosed in the '806 patent, the anti-kick forward device includes a motor which drives camming hardware to release cable from the anti-kick forward device at a controlled rate. This restricts the rate at which the saw can be moved by the user. In the preferred embodiment, electric power is provided to the variable resistor 40 via electrical conductor 42, and to the motor of the anti-kick forward device from the variable resistor 40 via electrical conductor 44. In an alternative embodiment, the speed control mechanism is connected to the drive motor of the power tool. If the power tool drive motor were so connected, the operating speed of the power tool drive motor would be varied. Alternatively, the speed governor 22 may include a carburetor governor in the event an internal combustion engine is used as the drive motor.

The stem portion 36 of the switch 24 includes a contact which, upon depression of the trigger portion 34, engages a rectilinear contact strip of resistive material of the variable resistor 40, so that electrical power may be provided to the anti-kick forward device motor via electrical conductor 44. Further depression of the trigger portion 34 causes the contact to slide along the rectilinear contact strip, varying the resistance of the variable resistor 40 in a known manner. This change of resistance causes a corresponding change in the electrical power provided to the motor. The variable resistor 40 also includes an internal switch biasing means, such as a spring, not specifically illustrated, which cooperates with the stem portion 36 to return the trigger switch 24 to a resting or off position when released by the tool user. Since arrangements such as these are known in the art, and since other speed governor devices are also known in the art which could be used with the present invention, no further discussion will be undertaken here.

With reference now to FIGS. 2 and 3, the cam assembly 26 includes a camshaft 46 connected at one end to a rotatable cam disk 48 and connected at the other end to a thumb wheel 50. In the preferred embodiment, the cam disk 48 has an arcuate periphery 54 as shown and, a cam disk stop 56 which abuts the arcuate periphery 54 and limits rotation of the cam disk 48. Thus, the cam disk 48 rotates as the thumb wheel 50 is rotated.

As best shown in FIG. 2, the handle 20 includes a notch 60 which receives the thumb wheel 50. In the preferred embodiment, the notch 60 is sized, and the thumb wheel 50 cooperates with the handle 20, such that the thumb wheel rotates with respect to the handle. Most preferably, a portion of the thumb wheel 50 slightly protrudes out of the notch 60 so that the tool user, when holding the handle 20 and depressing the trigger switch 24 with an index finger, can turn the thumb wheel 50 with the thumb of the same hand. For ease of operation, the outer edge of the thumb wheel 50 is preferably knurled or ridged as shown.

As best shown in FIG. 2, camshaft 46 rotatably cooperates with a support 62. The support 62 includes a bore through which the camshaft 46 extends and is fixably mounted to the handle 20, so as to give greater stability to the rotatable cam assembly 26.

As shown in FIGS. 2 and 3, the cam assembly 26 includes a follower 64 which is supported for axial movement within the handle 20 by fixed supports 66 and 68. The follower 64 includes a shoulder 70 and a spring 72 which is disposed between the support 66 and the shoulder 70. It should be appreciated that the spring 72 biases the follower 64 axially against the cam disk 48. The axial position of the follower 64 is determined by the cam disk 48. As the cam disk 48 is rotated clockwise from the position shown in FIG. 3, the follower 64 is axially displaced to the left, thereby limiting the extent to which the trigger switch 24 can be depressed. Accordingly, as the cam disk is rotated counter-clockwise, the follower 64 would be axially displaced back toward the position shown in FIG. 3.

During operation, the tool user depresses the trigger switch 24 until the trigger portion 34 engages the follower 64. At this point, the motor (here, of the anti-kick forward device) is operated at a particular speed. If the tool operator wishes to alter that operating speed, the user simply rotates the thumb wheel 50 clockwise or counter-clockwise, depending on whether the speed is to be decreased or increased. As a result, the extent to which the trigger switch 24 can be depressed varies, thereby varying the voltage provided to the motor. This adjustment can be made while the trigger switch 24 is depressed, or prior to operation of the power tool. Appropriate indicia may be provided on the power tool, for example proximate the thumb wheel 50, to indicate operational speeds and/or trigger switch positions. This would be especially useful in allowing the tool user to accurately switch between two or more speeds.

Referring once again to FIG. 1, there is illustrated a radial arm saw shown generally by reference numeral 10. The radial arm saw 10 includes a table 70 on which the material being cut may be supported. The table 70 is slidably connected to a column 72. In this manner, the vertical position of the table 70 can be varied. As shown, an arm assembly 74 is connected to the column 72 so as to permit the arm assembly 74 to be pivoted about the axis of the column 72.

With continuing reference to FIG. 1, a saw carriage 76 is mounted on the arm assembly 74 and is movable along the arm assembly in a generally radial direction relative to the column 72. The saw carriage 76 contains the saw drive motor which drives the saw blade 78. The handle 20 as described above is fixably attached to the saw carriage 76. As shown, the handle 20 is oriented to allow the tool user to pull the saw carriage 76 away from the column 72. Most preferably, the trigger switch 24 and the thumb wheel 50 are disposed on opposite sides of the handle 20. In this manner, the trigger switch 24 can be operated with an index finger and the thumb wheel 50 can be operated with the thumb of the same hand. The arm assembly 74 also preferably includes appropriate on/off switches shown generally by reference numeral 80, as well as a visual means, such as a light 82, for indicating the operating state of the saw itself.

As previously mentioned, the radial arm saw 10 includes an anti-kick forward device 12 which is fixably connected to the column 72 and is operably connected to the saw carriage 76 for limiting the maximum speed at which the saw carriage may be moved away from the column to a predetermined speed. During operation of the preferred embodiment, the tool user would activate the saw utilizing the on/off switches 80. Once the saw is operating and the saw blade is spinning, the user would then grasp the handle 20 and depress the trigger switch 24, typically to the point at which the trigger switch engages the follower 64. Accordingly, the speed governor 22 applies a particular voltage level to the motor of the anti-kick forward device 12, which, operating as described above and as described in the '806 patent, restricts the rate at which the saw carriage 76 may be moved by the user along the saw arm assembly 74. If the user desires to alter the rate at which the saw carriage can be moved, the user would then operate the thumb wheel 50 with the thumb of the hand grasping the handle 20. Rotation of the thumb wheel 50 in a clockwise direction imparts a clockwise rotation of the cam disk 48, reducing the rate at which the saw carriage 76 may be moved. Rotation of the thumb wheel 50 to the right imparts a counter-clockwise rotation to the cam disk 48, increasing the rate at which the saw carriage 76 may be moved by the user.

It is also understood, of course, that while the form of the invention herein shown and described constitutes a preferred embodiment of the invention, it is not intended to illustrate all possible forms thereof. It will also be understood that the words used are words of description rather than limitation, and that various changes may be made without departing from the spirit and scope of the invention disclosed.

What is claimed is:

1. A speed control mechanism allowing a user to control an operating speed of a power tool, the speed control mechanism comprising:
    a drive motor; and
    a handle connected to the power tool including a trigger, a speed governor and a cam assembly, the cam assembly including, a thumb wheel operable by the user, the thumb wheel connected to the handle for rotation relative thereto, and a cam disk connected to the thumb wheel for rotation therewith, and
    the trigger being displaced from a first position by the user to initiate operation of the drive motor, the trigger cooperating with the speed governor to vary the operating speed of the drive motor based on a displacement of the trigger, the cam assembly being operated by the user and cooperating with the trigger to control an extent to which the trigger can be displaced from the first position by the user, thereby limiting the operating speed of the power tool.

2. The speed control mechanism of claim 1 wherein the follower has an axis, a first end biased against the cam disk and a second end for engaging the displaced trigger, the follower being displaced along its axis as the thumb wheel is operated by the user, thereby controlling the extent to which the switch can be displaced by the user.

3. The speed control mechanism of claim 2 wherein the thumb wheel and the trigger are positioned about the handle such that when the handle is grasped by a hand of the user, the trigger can be operated with a finger and the thumb wheel can be operated by a thumb of the same hand.

4. The speed control mechanism of claim 2 further comprising a spring for biasing the first end of the follower against the cam disk.

5. The speed control mechanism of claim 1 wherein the drive motor is an electric motor.

6. The speed control mechanism of claim 5 wherein the speed governor is a variable resistor.

7. A speed control mechanism allowing a user to control an operating speed of a power tool, the speed control mechanism comprising:
- a drive motor; and
- a handle connected to the power tool including a trigger, a speed governor and a cam assembly,
- the trigger being displaced from a first position by the user to initiate operation of the drive motor, the trigger cooperating with the speed governor to vary the operating speed of the drive motor based on a displacement of the trigger, the cam assembly being operated by the user and cooperating with the trigger to control an extent to which the trigger can be displaced from the first position by the user, thereby limiting the operating speed of the power tool;
- wherein the trigger has a finger-engageable portion which allows the user to displace the trigger, and a stem portion connected to the finger-engageable portion and connected to the speed governor such that displacement of the trigger from the first position initiates operation of the drive motor and varies the operating speed of the drive motor, and wherein the speed governor includes a biasing means for returning the trigger to the first position when the trigger is released by the user.

8. The speed control mechanism of claim 1 wherein the drive motor is an internal combustion engine.

9. The speed control mechanism of claim 8 wherein the speed governor is a carburetor governor.

10. A speed control mechanism allowing a user to control the operating speed of a power tool, the speed control mechanism comprising:
- an electric drive motor; and
- a handle connected to the power tool including a trigger, a variable resistor and a cam assembly including a thumb wheel, a cam disk and a follower,
- the trigger being displaced from a first position by the user to initiate operation of the drive motor, the trigger cooperating with the variable resistor to vary the operating speed of the drive motor based on the displacement of the trigger,
- the thumb wheel being connected to the handle for rotation relative thereto by the user, the cam disk being connected to the thumb wheel for rotation therewith, the thumb wheel and the trigger being positioned about the handle such that when the handle is grasped by a hand of the user, the trigger can be operated with a finger and the thumb wheel can be operated by a thumb of the same hand,
- the follower having an axis, a first end biased against the cam disk and a second end for engaging the displaced trigger, the follower being displaced along its axis as the thumb wheel is operated by the user, thereby controlling the extent to which the trigger can be displaced by the user.

11. The speed control mechanism of claim 10 wherein the cam assembly further comprises a spring for biasing the follower against the cam disk.

12. A speed control mechanism for use with a radial arm saw including an anti-kick forward device for controlling a movement of the saw by a user, the speed control mechanism comprising:
- a radial saw arm assembly;
- a saw carriage, including a saw blade, connected to the radial saw arm assembly for movement theralong relative thereto by the user, the anti-kick forward device controlling the movement of the saw carriage by the user;
- a drive motor which drives the anti-kick forward device to allow the saw carriage to be moved; and
- a handle fixedly connected to the saw carriage, the handle including a trigger, a speed governor and a cam assembly, the cam assembly having a thumb wheel operable by the user, the thumb wheel connected to the handle for rotation relative thereto, a cam disk connected to the thumb wheel for rotation therewith, a follower cooperating with the cam and the trigger;
- the trigger being displaced from a first position by the user to initiate operation of the drive motor, the trigger cooperating with the speed governor to vary an operating speed of the drive motor based on a displacement of the trigger, the cam assembly being operated by the user and cooperating with the trigger to control the extent to which the trigger can be displaced from the first position by the user so as to control the operating speed of the drive motor, the operating speed of the drive motor determining a rate at which the saw carriage can be moved along the arm assembly by the user.

13. The speed control mechanism of claim 12 wherein the follower has an axis, a first end biased against the cam disk and a second end for engaging the displaced trigger, the follower being displaced along its axis as the thumb wheel is operated by the user, thereby controlling the extent to which the trigger can be displaced by the user.

14. The speed control mechanism of claim 13 wherein the thumb wheel and the trigger are positioned about the handle such that when the handle is grasped by a hand of the user, the trigger and the thumb wheel can be operated by a finger and a thumb on the same hand.

* * * * *